Aug. 30, 1960    H. L. LAMBERT    2,950,732
COMPRESSED AIR OR OTHER GAS CONTROL VALVES
Filed Sept. 11, 1958    2 Sheets-Sheet 1

Inventor
H.L. Lambert

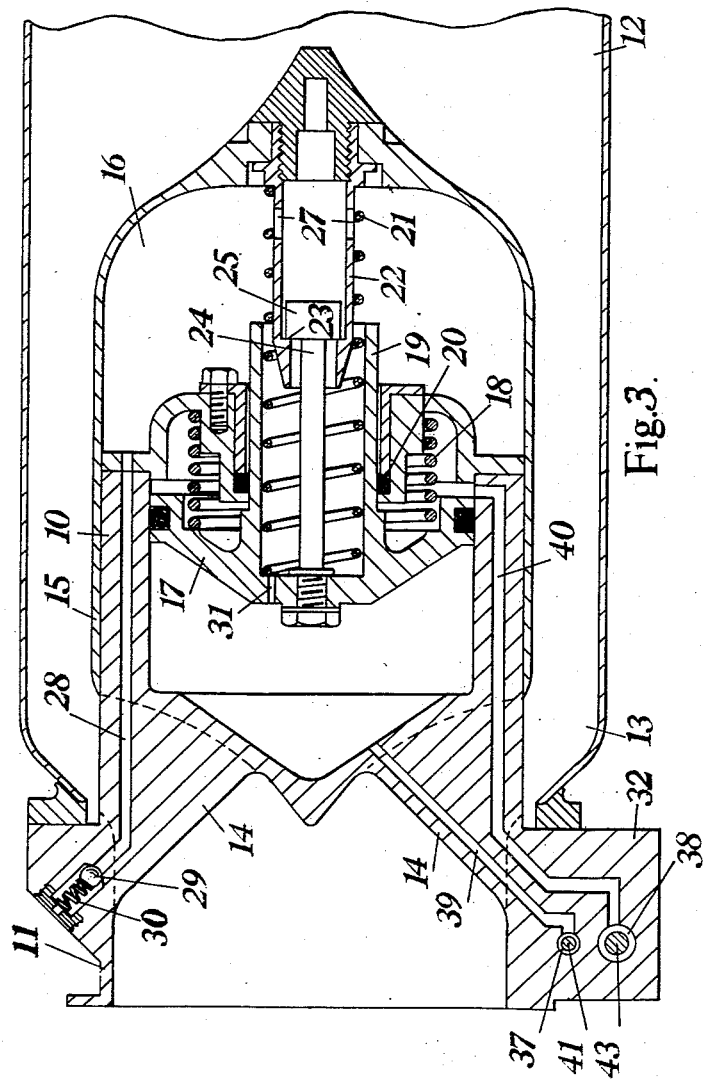

United States Patent Office 2,950,732
Patented Aug. 30, 1960

2,950,732

COMPRESSED AIR OR OTHER GAS CONTROL VALVES

Harold Leslie Lambert, Shirley, Solihull, England, assignor to Rotax Limited, London, England Filed Sept. 11, 1958, Ser. No. 760,330

1 Claim. (Cl. 137—219)

This invention relates to valves for controlling compressed air (or other gas), and has for its object to provide such a valve in a form adapted to control automatically the delivery pressure of the air.

A valve in accordance with the invention comprises a hollow body part which includes a hollow cylinder located between the inlet and outlet ends of the body part, a spring-loaded piston contained in the cylinder and having a spring-loaded telescopic piston rod extending therefrom through one end of the cylinder, a cylindrical shutter slidably mounted on the cylinder and adapted to control the flow of air through the body part, the shutter being attached at one end to the piston rod and being shaped at this end to enclose a space between it and the adjacent end of the cylinder, means for admitting air to the said space, a relief valve for controlling the air pressure in said space, and ancillary valve means for controlling the action of the piston by air pressure derived from the inlet end of the body part.

Figure 1:
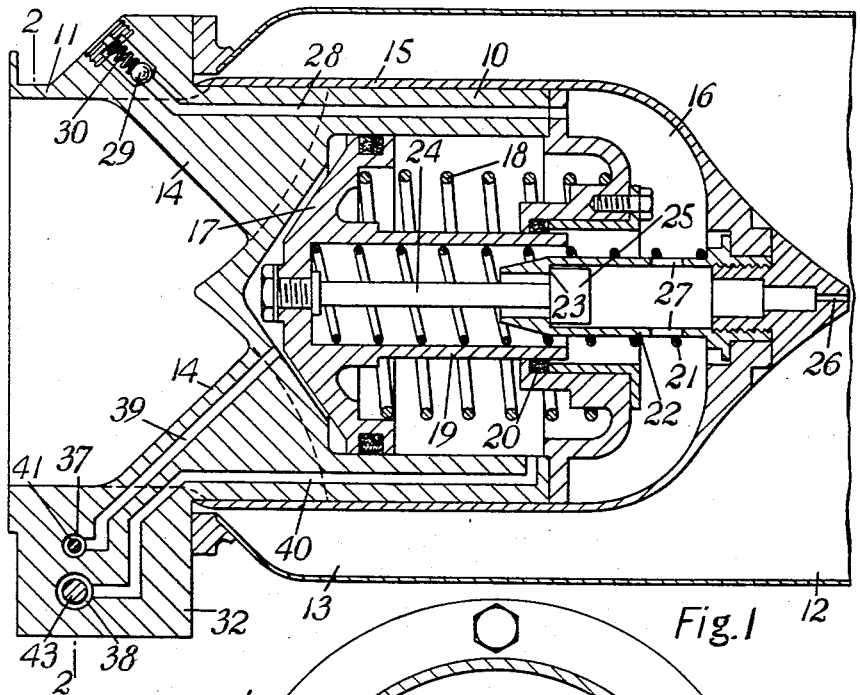
Figure 2:
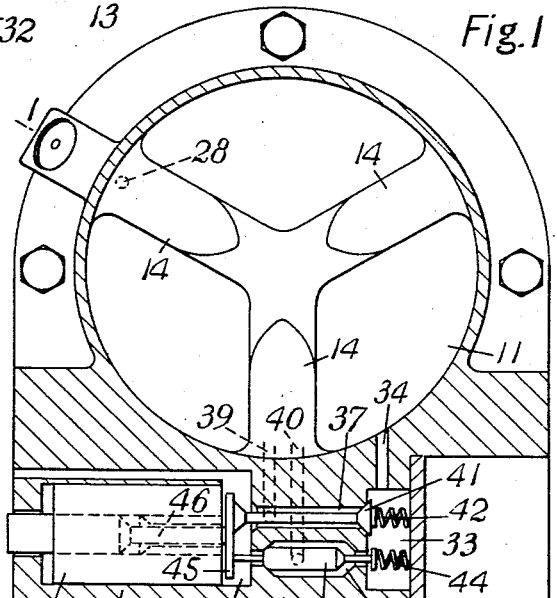

In the accompanying drawings, Figure 1 is a sectional side elevation on the line 1—1 of Figure 2, and Figure 2 is a sectional end elevation on the line 2—2 of Figure 1 illustrating an air control valve according to the invention with the shutter in its closed position. Figure 3 is a view similar to Figure 1 including a modified feature and showing the shutter in its fully open position.

As shown in the drawings, the body part is constructed to form a hollow cylinder 10 integral with coaxial air inlet 11 at one end of the cylinder, a coaxial air outlet 12 at the other end of the cylinder, and a part 13 forming an annular passage surrounding the cylinder. The part 10 is connected to the part 11 by integral radial ribs 14, the spaces between the ribs forming ports through which air can pass from the inlet to the passage 13 and thence to the outlet 12.

On the cylinder 10 is mounted a slidable cylindrical shutter 15 which at one end is adapted to control the air flow from the inlet through the said ports to the annular passage. The other end of the shutter is shaped to enclose a space 16 between it and the adjacent end of the cylinder.

Within the cylinder is contained a piston 17 which is loaded by a spring 18, and from one side of the piston extends a trunk 19 which passes through a gland 20 in the end of the cylinder remote from the inlet.

The piston is connected to the shutter by a two-part telescopic piston rod which is loaded by a spring 21 the ends of which are respectively supported by the piston and shutter. The part 22 of the piston rod attached to the shutter is hollow and has formed in it an annular shoulder 23. The other part 24 of the piston rod, which is contained in the said trunk is solid and has formed on it a head 25 for co-operating with the said shoulder to limit the extent to which the shutter can be moved relatively to the piston by the spring 21. Also on the axis of the closed end of the shutter is formed a restricted orifice 26 through which and ports 27 in the hollow portion 22 of the piston rod, air can pass from the outlet end of the body part to the space 16 between the shutter and cylinder.

In the cylinder wall is formed a passage 28 extending from the space 16 and through one of the ribs 14 to a relief valve 29 mounted on the inlet part 11, the valve being loaded by a spring 30 such as will allow the valve to open for venting air to the atmosphere when a predetermined air pressure is attained in the space 16.

Instead of the restricted orifice 26 above mentioned, there may be provided a restricted orifice 31 in the piston, (as shown in Figure 3), so that air can pass to the space 16 from the air inlet end of the cylinder. It will be understood that the diameter of either of these orifices is considerably less than the diameter of the passage 28 above mentioned.

On the body part is formed or secured an ancillary valve box 32 in which is formed a chamber 33 in communication with the air inlet 11 through a passage 34. Also in the valve box is formed a chamber 35 which at one end is open to the atmosphere and which accommodates the winding 36 of a solenoid. Between these chambers there are formed two bores 37, 38 which respectively communicate with the opposite ends of the cylinder 10 through passages 39, 40. In the bore 37 is contained an axially movable valve 41 loaded by a spring 42. This valve has a head at each end for co-operating with seatings at the ends of the bore 37. In the bore 38 is contained an axially slidable valve 43 loaded by a spring 44. This valve is shaped to co-operate at positions near its ends with seatings formed in the bore. The valves are movable against the actions of their associated springs by a head 45 on the movable core 46 of the solenoid.

In the condition shown in Figure 1, the right hand end of the valve 41 is in contact with its adjacent seating at the right hand end of the bore 37, thus isolating the passage 39 and chamber 35 from the chamber 33. At the same time the left hand end of the valve 43 is in contact with its adjacent seating, thus isolating the chamber 35 from the chamber 33, but leaving the passage 40 open to the chamber 33.

Assuming that the shutter 15 is in its closed position as shown in Figure 1 and that the air in the inlet 11 is under pressure from the source which supplies the air, the solenoid being inactive, air can pass from the inlet 11 and through the passage 34, chamber 33, and passage 40 to the right hand side of the piston 17, where it serves to supplement the action of the spring 18 for holding the shutter closed. To open the shutter, the solenoid is brought into action, so causing the valves 41, 43 to be moved to their other extreme positions. In these positions air can pass from the chamber 33 through the bore 37 of the valve 41 to the passage 39 and thence to the left hand side of the piston, so causing the piston to impart opening movement to the shutter through the medium of the spring 21, the air from the right hand side of the piston being allowed to escape to atmosphere through the passage 40, valve 43, and chamber 35.

Air under pressure now passes from the outlet end of the body part through the orifice 26 to the space 16, so that the pressure in this space 16 becomes equal to that at the outlet when the shutter is at rest in its open position. If the pressure at the outlet 12 exceeds the amount determined by the relief valve 29 the latter will open and so allow air from the space 16 to be vented to atmosphere. Due to the restricted communication afforded by the orifice 26 between the outlet 12 and the space 16, the air pressure in this space will now fall below that in the outlet. Consequently, the predominating pressure in the outlet will move the shutter towards its closed position against the action of the spring 21 until the air pressure in the outlet falls sufficiently to allow the valve 29 to re-close, whereupon the shutter comes to rest at a position which maintains the desired pressure in the outlet 12.

A similar action occurs when air is supplied to the space 16 through the alternative restricted orifice 31 shown in Figure 3. Whenever the pressure in this space exceeds that which can cause the relief valve to open, the opening of this valve will enable the pressure in the outlet 12 to move the shutter towards its closed position until the desired pressure is obtained in the outlet.

Reclosing of the shutter is effected by de-energising the solenoid and so enabling the springs 42, 44 to return the associated valves to the positions shown in Figure 1.

The air flow control valve above described is intended for use more particularly for controlling the supply of motive air to an air-driven turbine, such as is used, for example, in starting an engine, but it may be employed for other uses where it is required to control the pressure at which the air is delivered. Further the valve may be used for controlling gases other than air, and we desire it to be understood that the "air" as above employed is intended to include any other gas. Further whilst it is convenient to provide a solenoid for controlling the ancillary valve means, any other convenient alternative means such as a manually operable lever may be used.

Having thus described my invention what I claim as new and desire to secure by Letters Patent is:

A compressed gas valve comprising in combination a body part provided with a gas inlet and a gas outlet, and with ports for establishing communication between the gas inlet and outlet, a hollow closed cylinder rigid with the body part and located between the gas inlet and outlet, a spring-loaded piston contained in the cylinder, a cylindrical shutter slidably mounted on the cylinder to control gas flow through the ports in the body part, a spring-loaded telescopic piston rod means connected at opposite ends respectively to the piston and one end of the shutter and providing a resilient connection between said piston and said shutter, the said end of the shutter enclosing between it and the adjacent end of the cylinder a space to which gas under pressure from one side of the ports in the body part is admissible through a restricted orifice, a relief valve supported by said body part and having a larger flow capacity than the said orifice, said relief valve being in communication with said space for controlling the air pressure in the said space, a pair of passageways communicating with the interior of the cylinder at opposite sides of the piston, and ancillary valve means for alternatively controlling communication of the passageways with the gas inlet and the outer atmosphere, the shutter being movable towards its closed position by the air pressure in the outlet when the relief valve, is opened by the air pressure in the space between the said end of the shutter and the adjacent end of the cylinder.

References Cited in the file of this patent

UNITED STATES PATENTS

| | | |
|---|---|---|
| 1,483,991 | Slattery | Feb. 19, 1924 |
| 1,727,548 | Kruse | Sept. 10, 1929 |
| 2,364,626 | Emerson | Dec. 12, 1944 |
| 2,852,035 | Holle | Sept. 16, 1958 |